3,121,949
METHOD FOR MANUFACTURING TITANIUM
CLAD STEEL
Charles Wright, Jr., Coatesville, Pa., assignor to Lukens
Steel Company, Coatesville, Pa., a corporation of Pennsylvania
No Drawing. Filed Dec. 14, 1961, Ser. No. 159,436
10 Claims. (Cl. 29—471.5)

This invention relates to the production of composite metal products and, more particularly, to improvements in the cladding of carbon steel plates with titanium.

In the manufacture of titanium clad steel, it has been found that titanium reacts with steel to form weak and brittle bonds between the two metals, and this characteristic presents many problems in cladding titanium to steel by the conventional roll bonding methods.

In the methods now used in cladding titanium to steel certain diffusion barriers have been used in roll bonding methods of cladding. Some of the diffusion barriers used are as follows: electro-plated iron or nickel, ferro-chromium alloys comprising from 11% to 30% chromium, and a vanadium-copper combination. Titanium steel is also made by brazing methods using silver or silver alloys as brazing materials.

In my experience with the above-mentioned diffusion barriers in connection with the roll bonding of titanium to steel, it was noted that considerable decarburization of the backing steel took place adjacent to the bond zone. This phenomenon is due to the diffusion of carbon in the steel into the titanium and results in a decrease in bond ductility. Therefore, the principal object of this invention is to retard the diffusion of carbon from the backing steel into the bond zone, and thereby prevent a decrease in the bond ductility. This object has been accomplished by adding strong carbide formers such as chromium, molybdenum, vanadium, titanium, columbium, or zirconium, or any combination of these elements to the backing steel either during the melting process or by diffusion methods after the backing steel has been processed.

The steps of my cladding process comprise assembling a sandwich by placing a titanium or titanium alloy plate or plates between two low alloy backing steel slabs containing any one (except titanium alone is not added to the steel during any diffusion process, but may be added to the melt in the production of the steel slab); or a combination of the aforementioned strong carbide formers may be used. The sandwich is then welded around its periphery to form a hermetic seal in order to protect the titanium from contamination by gases. Further protection to the titanium from gaseous contamination is accomplished by vacuum, or gas flushing techniques using argon or helium during heating to 1550° F. to 1900° F. The sandwich is then heated and rolled to the desired gauge thickness with a minimum reduction of 2 to 1.

Using low alloy steels containing a metal from the group in the percentages of 0.20% to 6.00% chromium; 0.25% to 1.00% molybdenum; 0.10% to 1.50% titanium; 0.01% to 0.50% columbium; 0.10% to 0.50% vanadium; and 0.10% to 1.50% zirconium have shown excellent bond ductility after heating and rolling.

All of these carbide formers may be added alone, except titanium, to the backing steel either during the melting process or by diffusion methods after the backing steel has been processed. When using titanium alone it should be added to the backing steel during the melting process only, and not added by any diffusion method.

As an example of the combination of one or more of the elements noted above, low alloy steels containing from 0.50 to 2.50% chromium and 0.25 to 1.00% molybdenum have provided integrally bonded titanium clad steel plates. These plates have shown excellent bond ductility even after eight cycles of heating to 1400° F. for two hours and then air cooling.

Consideration of the two methods of adding the carbide formers to the steel indicates that the addition during the melting process is to be preferred over the step of adding the carbide formers by a diffusion method, and as above stated the addition during the melting process is the only step used when using titanium alone.

The elements chromium, molybdenum, vanadium, titanium, columbium and zirconium may be used alone as defined above, or any combination of two or more of them may be used within the percentage ranges to produce sufficient carbide formers whereby to increase the bond ductility between titanium plate and the backing steel slabs during the roll bonding thereof, the said plate and slabs being subjected to the roll bonding after heating to between 1550° F. to 1990° F. following the formation of a hermetic seal by welding to protect the titanium plate from contamination by gases, and by gas flushing and/or vacuum techniques as noted above.

The sandwich described may take the form shown in United States Patent No. 2,813,332, granted November 19, 1957, to Keay. As set forth in the patent to Keay and well-known to the art, instead of flushing with an inert gas, a vacuum arrangement may be utilized. The parting layer and barrier layers disclosed in the patent to Keay are not to be considered a sine qua non for the scope of this invention. As will be apparent from the prior disclosure, the process of this invention may be purposefully employed either with or without such barrier layers to retard carbon diffusion from the backing plates. It is contemplated that parting layers as utilized in the Keay patent will generally be used in this invention. This is not, however, absolutely necessary, inasmuch as where a single titanium plate is used without parting layers it may be cut lengthwise to provide two composite cladded sheets.

The words "titanium plate" in the claims include a plate composed of titanium alloy as well as a plate composed of titanium alone.

This application is a continuation-in-part of my application, Serial No. 718,111, filed February 28, 1958, and now abandoned.

The above description discloses several embodiments of the invention, and specific language has been employed in describing the same. It will, nevertheless, be understood that no limitations of the scope of the invention are thereby contemplated, and that various alterations and modifications may be made as would occur to one skilled in the art to which the invention relates.

I claim:
1. In the manufacture of titanium clad steel, the process which consists of adding to steel during the melting operation a carbide former from the group of chromium, molybdenum, titanium, columbium, vanadium, and zirconium, processing the steel to form backing plates, said carbide former consisting of a metal constituent in the steel of 0.20% to 6.00% chromium; 0.25% to 1.00% molybdenum; 0.10% to 1.50% titanium; 0.01% to 0.50% columbium; 0.10% to 0.50% vanadium and 0.10% to 1.50% zirconium, each to be used alone, or in combination, to accomplish the same result within the percentages of these ranges, assembling a sandwich comprising said slabs with a plate of titanium between the said backing slabs and the surfaces of the said backing slabs in face to face relationship with the faces of the titanium plate, hermetically sealing the interior of the sandwich to protect said titanium plate from gaseous contamination, eliminating the air from said sandwich, heating and rolling said sandwich at a pressure sufficient to bond the layers together during the rolling operation to the desired gauge thickness with a minimum reduction in thickness of 2 to 1.

2. In the manufacture of titanium clad steel, the process which consists of diffusing into at least one surface of each of a pair of backing steel slabs a carbide former from the group of chromium, molybdenum, titanium, columbium, vanadium, and zirconium consisting of a metal constituent in the steel of 0.20% to 6.00% chromium; 0.25% to 1.00% molybdenum; 0.10% to 1.50% titanium; 0.01% to 0.50% columbium; 0.10% to 0.50% vanadium and 0.10% to 1.50% zirconium, each to be used alone, except titanium, or in combination, to accomplish the same result within the percentages of these ranges, assembling a sandwich comprising said slabs with a plate of titanium between the said backing slabs and the said diffused surfaces of the said backing slabs in face to face relationship with the faces of the titanium plate, hermetically sealing the interior of the sandwich to protect said titanium plate from gaseous contamination, eliminating the air from said sandwich, heating and rolling said sandwich at a pressure sufficient to bond the layers to each other during the rolling operation to the desired gauge thickness with a minimum reduction in thickness of 2 to 1.

3. In the manufacture of titanium clad steel, the process which consists of diffusing into at least one surface each of a pair of steel backing slabs a strong carbide former from the group of chromium and molybdenum consisting of a metal constituent of 0.50% to 2.50% chromium or 0.25% to 1.00% molybdenum, assembling a sandwich comprising said slabs with a plate of titanium between the said backing slabs with the diffused surfaces of the said backing slabs in face to face relationship with the faces of the titanium plate, hermetically sealing the interior of said sandwich to protect said titanium plate from gaseous contamination, eliminating the air from said sandwich, heating and rolling said sandwich at a pressure sufficient to bond the layers together during the rolling operation to the desired gauge thickness with a minimum reduction of 2 to 1 in thickness.

4. In the manufacture of titanium clad steel, the process which consists of adding to steel during the melting operation a carbide former from the group of chromium, molybdenum, titanium, columbium, vanadium, and zirconium, processing the steel to form backing plates, said carbide former consisting as a percentage in said steel of 0.20% to 6.00% chromium; 0.25% to 1.00% molybdenum; 0.10% to 1.50% titanium; 0.01% to 0.50% columbium; 0.10% to 0.50% vanadium and 0.10% to 1.50% zirconium, each to be used alone, or in combination, to accomplish the same result within the percentages of these ranges, assembling a sandwich comprising said slabs with a plate of titanium between the said backing slabs and the surfaces of the said backing slabs in face to face relationship with the faces of the titanium plate, hermetically sealing the interior of the sandwich to protect said titanium plate from gaseous contamination, eliminating the air from said sandwich, heating between 1550° F.–1900° F. and rolling said sandwich at a pressure sufficient to bond the layers together during the rolling operation to the desired gauge thickness with a minimum reduction in thickness of 2 to 1.

5. In the manufacture of titanium clad steel, the process which consists of diffusing into at least one surface of each of a pair of backing steel slabs a carbide former from the group of chromium, molybdenum, titanium, columbium, vanadium, and zirconium consisting of a metal constituent in the steel of 0.20% to 6.00% chromium; 0.25% to 1.00% molybdenum; 0.10% to 1.50% titanium; 0.10% to 0.50% columbium; 0.10% to 0.50% vanadium and 0.10% to 1.50% zirconium, each to be used alone, except titanium, or in combination, to accomplish the same result within the percentages of these ranges, assembling a sandwich comprising said slabs with a plate of titanium between the said backing slabs and the said diffused surfaces of the said backing slabs in face to face relationship with the faces of the titanium plate, hermetically sealing the interior of the sandwich to protect said titanium plate from gaseous contamination, eliminating the air from said sandwich, heating to between 1550° F.–1900° F. and rolling said sandwich at a pressure sufficient to bond the layers to each other during the rolling operation to the desired gauge thickness with a minimum reduction in thickness of 2 to 1.

6. In the manufacture of titanium clad steel, the process which consists of diffusing into at least one surface each of a pair of steel backing slabs a strong carbide former from the group of chromium and molybdenum as a metal constituent in the steel of 0.50% to 2.50% chromium and 0.25% to 1.00% molybdenum, assembling a sandwich comprising said slabs with a plate of titanium between the said backing slabs with the diffused surfaces of the said backing slabs in face to face relationship with the faces of the titanium plate, hermetically sealing the interior of said sandwich to protect said titanium plate from gaseous contamination, eliminating the air from said sandwich, heating to between 1550° F.–1900° F. and rolling said sandwich at a pressure sufficient to bond the layers together during the rolling operation to the desired gauge thickness with a minimum reduction of 2 to 1 in thickness.

7. A method for manufacturing titanium clad steel which comprises assembling a titanium plate between two low alloy steel slabs, positioning in direct face-to-face contact the low-alloy steel slabs with the faces of said titanium plate between them and with each of said slabs containing in the vicinity of their titanium-contacting faces chromium in the range of 0.50 to 2.50 percent and molybdenum in the range of 0.25 to 1.00 percent, providing a means for hermetically closing the periphery of the sandwich to form a seal for protecting the titanium plate from contamination by gases, further protecting said titanium plate from gaseous contamination by flushing the sandwich with an inert gas which is inert to heated titanium, heating the sandwich to 1550° F. to 1900° F., and then rolling the sandwich to the desired thickness and at a pressure sufficient to bond the layers together during the rolling operation.

8. A method of manufacturing titanium clad steel as defined in claim 7, wherein said inert gas is argon, and rolling the sandwich until thickness is reduced to a minimum of 2 to 1.

9. The method of manufacturing clad steel as defined in claim 7, wherein the step of hermetically closing the periphery of the sandwich includes welding around the periphery of the sandwich until a hermetic seal is provided whereby to protect the titanium from contamination by gases.

10. In the manufacture of titanium clad steel, the process which consists of adding to steel during the melting operation 0.25 to 1.00% molybdenum, processing the steel to form a backing plate, placing a plate of titanium over said backing plate, the surfaces of said backing plate and said titanium plate being in face to face relationship, assembling said plates in a hermetically sealed steel sandwich to protect said titanium plate from gaseous contamination, eliminating air from said sandwich, heating and rolling said sandwich with a pressure sufficient to bond said plates together during the rolling operation to the desired gauge thickness with a minimum reduction of thickness of 2 to 1.

References Cited in the file of this patent

UNITED STATES PATENTS

| | | |
|---|---|---|
| 2,759,249 | Eberle | Aug. 21, 1956 |
| 2,813,332 | Keay | Nov. 19, 1957 |
| 2,908,969 | Wagner | Oct. 20, 1959 |
| 2,985,955 | Rostoker et al. | May 30, 1961 |
| 2,993,269 | Kelley | July 25, 1961 |

FOREIGN PATENTS

| | | |
|---|---|---|
| 715,917 | Great Britain | Sept. 22, 1954 |

UNITED STATES PATENT OFFICE
CERTIFICATE OF CORRECTION

Patent No. 3,121,949            February 25, 1964

Charles Wright, Jr.

It is hereby certified that error appears in the above numbered patent requiring correction and that the said Letters Patent should read as corrected below.

Column 4, line 11, for "0.10% to 0.50% columbium" read -- 0.01% to 0.50% columbium --.

Signed and sealed this 7th day of July 1964.

(SEAL)
Attest:

ERNEST W. SWIDER            EDWARD J. BRENNER
Attesting Officer            Commissioner of Patents